US008818264B2

(12) United States Patent
Yen et al.

(10) Patent No.: US 8,818,264 B2
(45) Date of Patent: Aug. 26, 2014

(54) DATA TRANSMITTING METHOD, DATA CONTROLLING MODULE AND MOBILE DEVICE USING THE SAME

(75) Inventors: Li-Kang Yen, Taipei (TW); Chih-Hsien Hou, Taipei (TW); Ming-Hsin Kuo, Taipei (TW)

(73) Assignee: Pegatron Corporation, Taiepei (TW)

( * ) Notice: Subject to any disclaimer, the term of this patent is extended or adjusted under 35 U.S.C. 154(b) by 179 days.

(21) Appl. No.: 13/429,050

(22) Filed: Mar. 23, 2012

(65) Prior Publication Data

US 2012/0244800 A1 Sep. 27, 2012

(30) Foreign Application Priority Data

Mar. 25, 2011 (TW) .............................. 100110359 A

(51) Int. Cl.
*H04B 7/24* (2006.01)
(52) U.S. Cl.
USPC ............ 455/39; 455/48; 455/41.12; 455/41.2; 455/103; 455/59; 455/552.1; 455/553.1
(58) Field of Classification Search
CPC ... H04W 16/14; H04W 52/243; H04W 88/06; H04N 21/43637; H04N 21/2385; H04B 15/00; G01S 5/0242; H03J 5/244
USPC ......... 455/41.1, 41.2, 103, 59, 60, 61, 39–48, 455/400–466, 550.1–575.9
See application file for complete search history.

(56) References Cited

U.S. PATENT DOCUMENTS 8,107,999 B2 * 1/2012 Pandruvada ................ 455/552.1
8,380,244 B2 * 2/2013 Gorsuch .................... 455/553.1
8,498,574 B2 * 7/2013 Beninghaus et al. ........ 455/63.1
2003/0024729 A1 * 2/2003 Suzuki et al. ............ 174/117 FF
2003/0224729 A1 * 12/2003 Arnold .............................. 455/59
2004/0204039 A1 * 10/2004 Ogawa ........................ 455/553.1
2004/0209579 A1 * 10/2004 Vaidyanathan ............... 455/101
2011/0030020 A1 * 2/2011 Halttunen ....................... 725/98

FOREIGN PATENT DOCUMENTS

| CN | 101179796 A | 5/2008 |
|---|---|---|
| CN | 101252734 A | 8/2008 |
| TW | 200509602 A | 3/2005 |
| TW | 200904130 A | 1/2009 |

* cited by examiner

*Primary Examiner* — Edward Urban
*Assistant Examiner* — Max Mathew
(74) *Attorney, Agent, or Firm* — Muncy, Geissler, Olds & Lowe P.C.

(57) ABSTRACT

A data transmitting method, a data controlling module and a mobile device using the same are disclosed for transmitting data from the mobile device to a destination on an internet. The mobile device includes a first communication module and a second communication module. First, a first internet connection between the first communication module and the internet is established. Next, a second internet connection between the second communication module and the internet is established. Then, a local area connection between the first and second communication modules is established. The data to be transmitted are divided into several packets. A first part of the packets is transmitted from the first communication module to the destination through the first internet connection, and a second part of the packets is transmitted from the first communication module to the destination through the local area connection and the second internet connection.

11 Claims, 5 Drawing Sheets

DATA TRANSMITTING METHOD, DATA CONTROLLING MODULE AND MOBILE DEVICE USING THE SAME

CROSS REFERENCE TO RELATED APPLICATIONS

This Non-provisional application claims priority under 35 U.S.C. §119(a) on Patent Application No(s). 100110359 filed in Taiwan, Republic of China on Mar. 25, 2011, the entire contents of which are hereby incorporated by reference.

BACKGROUND OF THE INVENTION

1. Technology Field

The disclosure relates to a data transmitting method and, in particular, to a data transmitting method applied to a mobile device for integrating internet connections of multiple telecommunication modules to obtain the best connection rate.

2. Related Art

Based on progresses of the mobile network technology and consuming electronic products, various kinds of portable electronic products, such as mobile phone, e-paper, laptop computer, PDA, etc., are usually equipped with more powerful and complex functions. For example, many communication or mobile network functions are integrated, so that the compact mobile device can have many applications such as sending/receiving E-mails, browsing web pages, viewing on-line videos, GPS navigating, and the likes.

Under the current various network structures, the data transmission rate of fixed broadband network (e.g. ADSL or optical network) may reach 10 Mbps and, theoretically, up to 1 Gbps. Accordingly, the applications of multimedia web page, 3D image, interactive network, video on demand, and voice over IP are carried out recently. All these new internet applications require the support of larger network bandwidth. However, compared with the fixed broadband network, the mobile network is obviously unsatisfied on the on-line cost, available network bandwidth, and connection quality.

Regarding to the common GPRS and 3G/4G mobile communication technologies, the uploading and downloading technologies of the mobile data still have many bottlenecks. Taking 3G mobile communication technology as an example, the ideal transmission rate for a single connection is only about 3.84 Mbps. Thus, the bandwidth of the network transmission becomes a very precious resource under the circumstance of many users.

If the bandwidth is limited and the transmission rate is insufficient, many applications and functions (e.g. video on demand and multimedia interaction) can not be operated smoothly, so that the mobile on-line function of the handheld device is restricted.

SUMMARY

The disclosure is to provide a data transmitting method.

In an aspect, the data transmitting method is applied to a mobile device for transmitting data from the mobile device to a destination on an internet. The mobile device comprises a first communication module and a second communication module. The method comprises the following steps of: establishing a first internet connection between the first communication module and the internet; establishing a second internet connection between the second communication module and the internet; establishing a local area connection between the first communication module and the second communication module; dividing the data to be transmitted into several packets; and transmitting a first part of the packets from the first communication module to the destination through the first internet connection, and a second part of the packets from the first communication module to the destination through the local area connection and the second internet connection.

The present invention is also to provide a mobile device for performing the above-mentioned data transmitting method.

In an embodiment, the mobile device includes a first communication module for establishing a first internet connection between the first communication module and an internet, a second communication module for establishing a second internet connection between the second communication module and the internet, a plurality of local area communication modules for establishing a local area connection between the first communication module and the second communication module, a packet dividing module for dividing data to be transmitted into a plurality of packets, and a data controlling module. The data controlling module is configured to transmit a first part of the packets from the first communication module to the destination through the first internet connection, and a second part of the packets from the first communication module to the destination through the local area connection and the second internet connection.

The embodiment is further to provide a data transmitting method.

In an embodiment, the data transmitting method is applied to a mobile device, which comprises a first communication module and a second communication module. A first internet connection is established between the first communication module and an internet, and a local area connection is established between the first communication module and the second communication module. The method comprises the following steps of: receiving a packet; selectively transmitting the packet through one of the first internet connection and the local area connection; if the packet is to be transmitted through the local area connection, encapsulating the packet; and transmitting the encapsulated packet through the local area connection.

The embodiment is also to provide a data controlling module.

In an embodiment, the data controlling module is applied to a mobile device, which comprises a first communication module and a second communication module. A first internet connection is established between the first communication module and an internet, and a local area connection is established between the first communication module and the second communication module. The data controlling module comprises a receiving unit, a processing unit, an encapsulating unit, and a transmitting unit. The receiving unit is configured for receiving a packet. The processing unit is configured for selectively transmitting the packet through one of the first internet connection and the local area connection. The encapsulating unit is configured for encapsulating the packet if the processing unit determines that the packet is to be transmitted through the local area connection. The processing unit controls the transmitting unit to selectively transmit the encapsulated packet through either the first internet connection or the local area connection.

These and other features, aspects and advantages of the present invention will become better understood with regard to the following description, appended claims, and accompanying drawings.

DETAILED DESCRIPTION OF THE INVENTION

Figure 1:
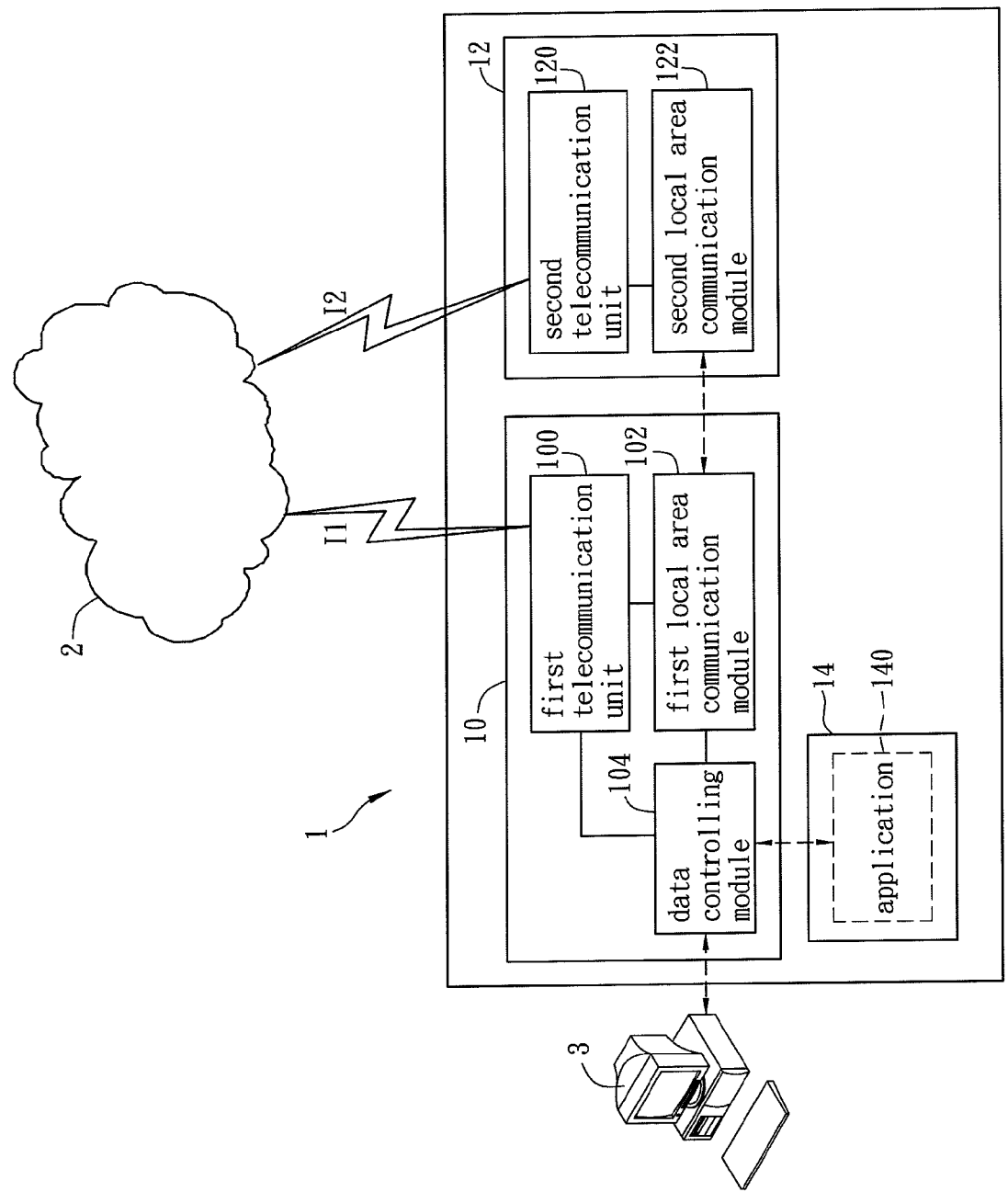
FIG. 1 is a schematic diagram showing a mobile device according to an embodiment of the present invention.

FIG. 1 is a schematic diagram showing a mobile device 1 according to an embodiment of the present invention. As shown in FIG. 1, the mobile device 1 comprises two communication modules (a first communication module 10 and a second communication module 12) and a processing module 14. The first communication module 10 comprises a first telecommunication unit 100, while the second communication module 12 comprises a second telecommunication unit 120.

The first communication module 10 and the second communication module 12 can be at least one of a GSM communication unit, a 3G mobile communication unit, and a 4G mobile communication unit. For example, the first communication module 10 and the second communication module 12 can be a GPRS unit, an enhanced data rates for GSM evolution (EDGE) unit, a UMTS (Universal Mobile Telecommunications System) unit, a HSDPA (High Speed Downlink Packet Access) system, a CDMA unit, a WCDMA unit, and/or other similar wireless communication units.

In this embodiment, the first communication module 10 is a WCDMA unit with a 3G network structure, and the second communication module 12 is a GPRS unit with a GSM structure. The first communication module 10 and the second communication module 12 establish a first internet connection I1 and a second internet connection I2, respectively, for communicating to an internet 2. To be noted, the first communication module 10 and the second communication module 12 may have different IP addresses for connecting to the internet 2.

This invention is not limited to the above-mentioned example involving two communication modules. In practice, the mobile device 1 may further comprise a third communication module or more communication modules depending on the demands of the designer and user. To make the description clearer, the mobile device 1 of the following example includes two communication modules (a first communication module 10 and a second communication module 12). In this case, the mobile device 1 can be a mobile phone, a PDA, an e-paper, or a smart phone.

In this embodiment, the first communication module 10 further comprises a first local area communication module 102, and the second communication module 12 further comprises a second local area communication module 122. A local area connection is established between the first local area communication module 102 and the second local area communication module 122 for communicating the first communication module 10 and the second communication module 12.

Figure 3A:
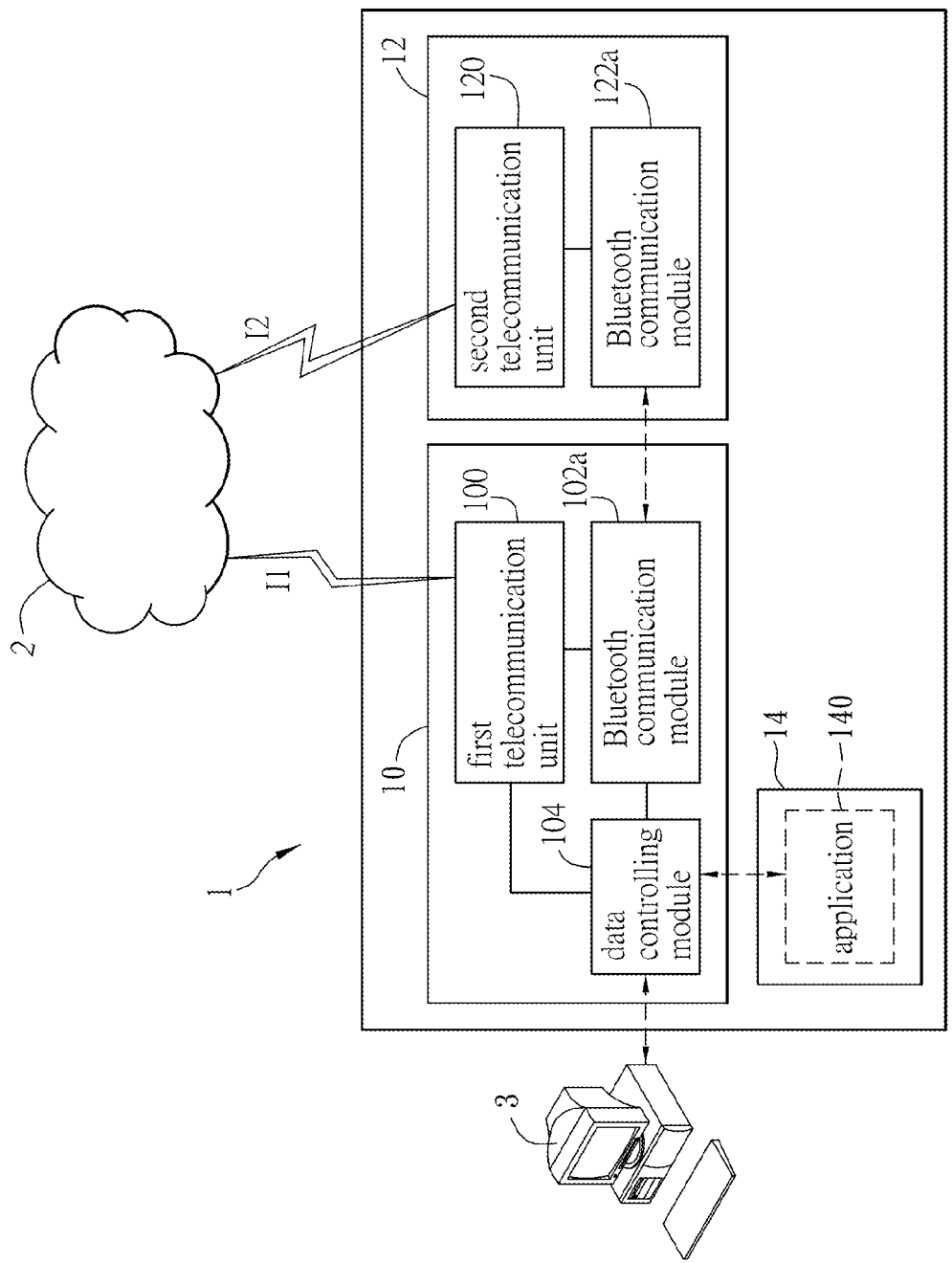
FIGS. 3A to 3C show different types of the local area connection module.
Figure 3B:
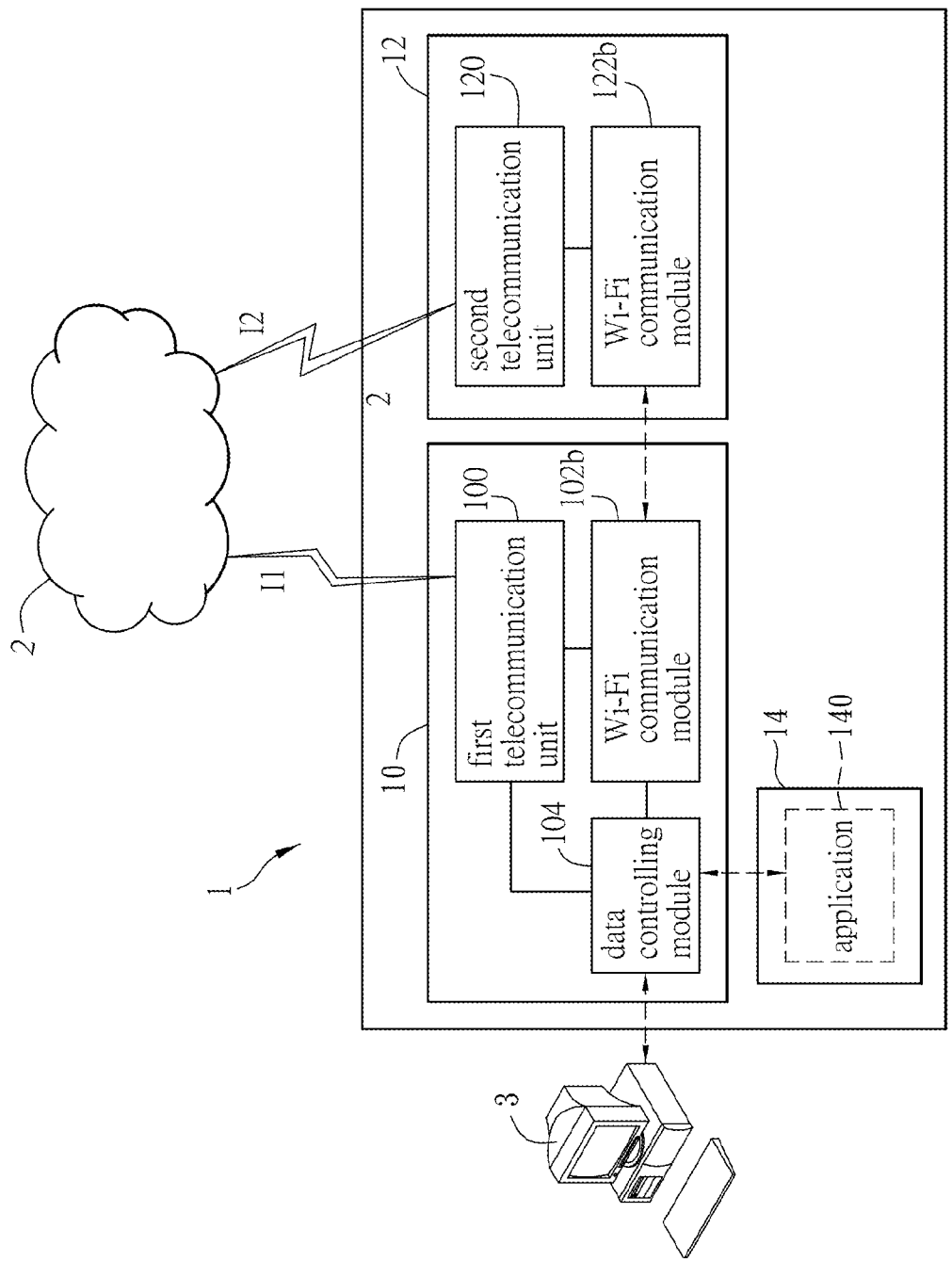
Figure 3C:
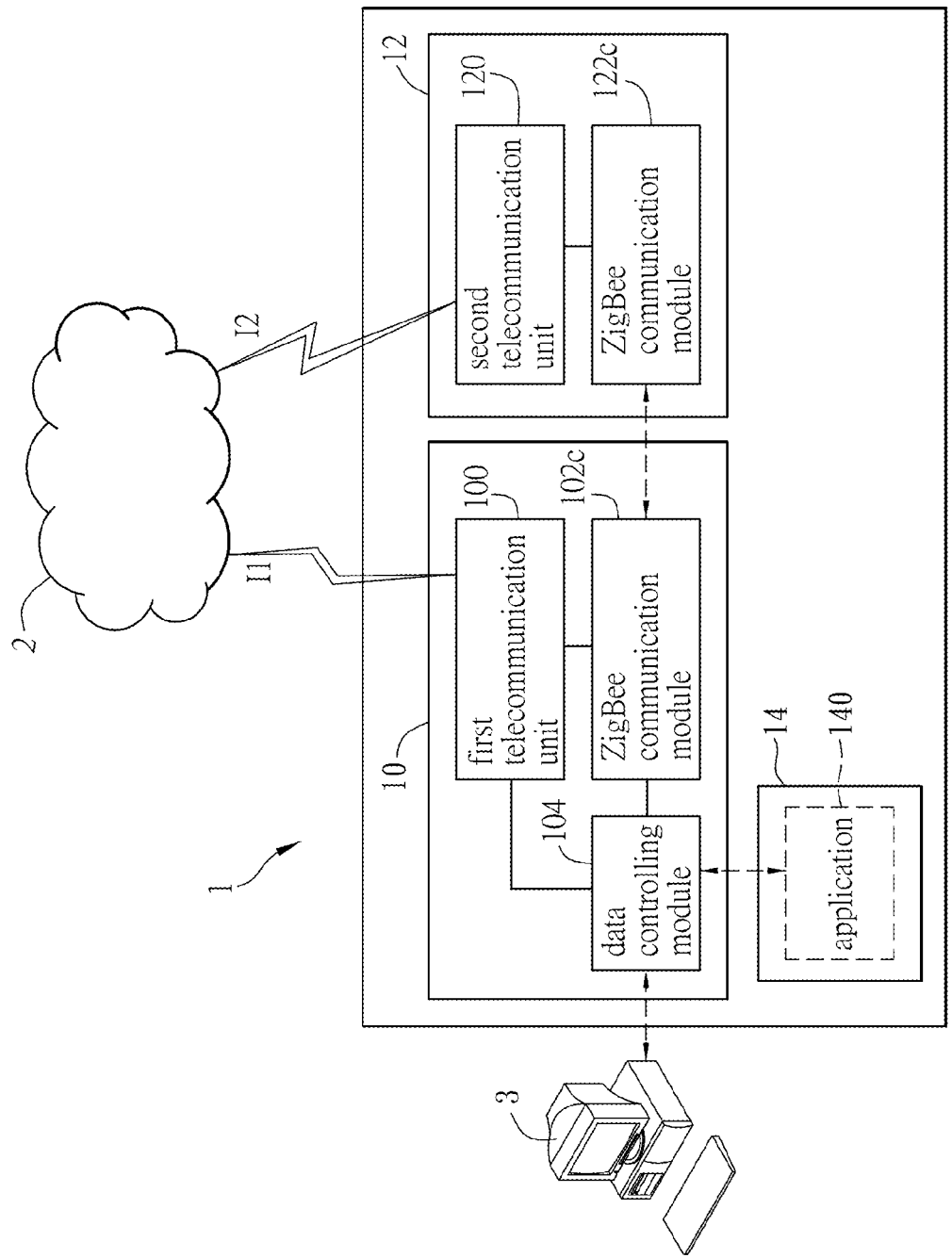

The above-mentioned local area communication modules, the first local area communication module 102 and the second local area communication module 122, may comprise at least one of a Bluetooth communication module, a Wi-Fi communication module, or a ZigBee communication module. The local area connection between the local area communication modules can be a wired/wireless LAN or PAN. For example, a node-to-node PAN can be formed between the first communication module 10 and the second communication module 12 by the Bluetooth communication modules. As shown in FIG. 3A, the first local area communication module 102a and the second local area communication module 122a are Bluetooth communication module. In FIG. 3B, the first local area communication module 102b and the second local area communication module 122b are Wi-Fi communication module. In FIG. 3C, the first local area communication module 102c and the second local area communication module 122c are ZigBee communication module.

To be noted, the first communication module 10 of this embodiment may further comprise a data controlling module 104, which is electrically connected with the first telecommunication unit 100 and the first local area communication module 102. The data controlling module 104 can be a software control program, a firmware control program, or a hardware control circuit. Referring to FIG. 1, the data controlling module 104 of this embodiment is configured within the first communication module 10. In practice, the data controlling module 104 can be an individual component configured at outside of the first communication module 10, or a software control program executed by the processing module 14 of the mobile device 1.

Figure 2:
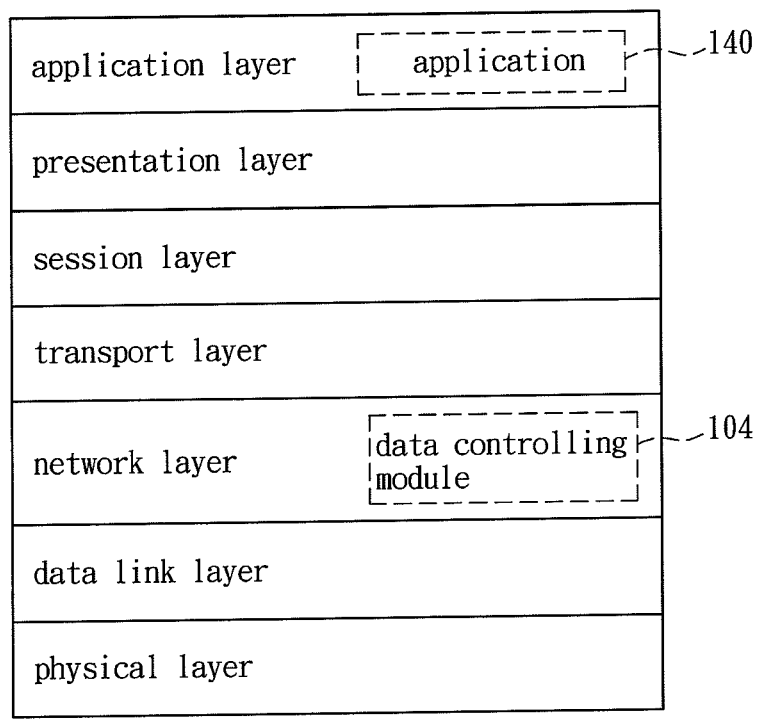
FIG. 2 is a schematic diagram showing the system protocol structure of the mobile device.

FIG. 2 is a schematic diagram showing the system protocol structure of the mobile device 1. With reference to FIGS. 1 and 2, according to the OSI model, the general network connection software layers comprise the application layer, presentation layer, session layer, transport layer, network layer, data link layer and physical layer, wherein the application layer directly interacts with the user, and the physical layer corresponds to the hardware components. In this embodiment, the data controlling module 104 is constructed on the network layer. Besides, the processing module 14 of the mobile device 1 can execute different applications 140 such as an internet browser, a voice communication program, a GPS program, and the likes. The applications 140 are mainly constructed on the application layer, and the data controlling module 104 can operate corresponding to the request from the applications 140.

In this embodiment, the first communication module 10 establishes a first internet connection I1 by the first telecommunication unit 100, and the second communication module 12 establishes a second internet connection I2 by the second telecommunication unit 120. The internet connections I1 and I1 have different bandwidths, respectively, and they may have individual communication parameters such as the network addresses and connection rate. When the application 140 (e.g. a browser) is intend to transmit/receive data packets, it firstly calls the data controlling module 104 for dynamically distributing multiple data packets to be transmitted/received, which are then transmitted through the first internet connection I1 and the second internet connection I2.

In another embodiment, the mobile device 1 of this invention can be functioned as a modem or a gateway for other electronic device 3, such as a PC. The electronic device 3 may be connected with the mobile device 1 through a wired or wireless connection (e.g. USB cable or Bluetooth), and then link to the external internet through the mobile device 1.

To be noted, the mobile device 1 of this embodiment can connect to the internet 2 not only through the first internet connection I1 established by the first communication module 10, but also through the second internet connection I2 established by the second communication module 12 via the local area connection established between the first local area communication module 102 and the second local area communication module 122. In this case, the local area connection between two communication modules can easily help the mobile device 1 to conquer the transmission rate of a single internet connection. In other words, if the upper limit of the transmission rate of the first internet connection is X1 and the upper limit of the transmission rate of the second internet connection is X2, the mobile device 1 can theoretically reach the maximum transmission rate of X1+X2 based on the above structure of the invention.

In one preferred embodiment of the present invention, the data controlling module 104 at least comprises a receiving unit, a processing unit, an encapsulating unit, and a transmitting unit. The receiving unit is configured for receiving a packet. The processing unit is configured for selectively transmitting the packet through one of the first internet connection I1 and the local area connection of the first communication module 10. The encapsulating unit is configured for encapsulating the packet if the processing unit determines that the packet is to be transmitted through the local area connection. Finally, the processing unit controls the transmitting unit to selectively transmit the encapsulated packet through either the first internet connection I1 or the local area connection.

Moreover, the data controlling module 104 may further comprise a recording unit for recording a first connection status with respect to the first internet connection I1 and a second connection status with respect to the second internet connection I2. Accordingly to the first and second connection statuses, the processing unit can determine to transmit the encapsulated packet through the first internet connection I1 or the local area connection and the second internet connection I2. In more specific, the processing unit can dynamically distribute a first part of the packet to be transmitted through the first internet connection I1 and a second part of the packet to be transmitted through the second internet connection I2 accordingly to the first and second connection statuses. In other words, the processing unit can dynamically adjust percentages of the first part and the second part according to the first and second connection statuses.

In the above-mentioned dynamically distributing step, the data controlling module 104 can monitor and record the connection statuses of the first internet connection I1 and the second internet connection I2, and then dynamically distribute the packet to be transmitted according to the connection statuses. For example, the data controlling module 104 can adjust the weights of the packet for transmitting through the first communication module 10 and the second communication module 12 according to the percentages X1 and X2.

In this embodiment, after receiving a success message of the internet connection from the second communication module 12, the data controlling module 104 analyzes and records some information (e.g. network system, network traffic, IP address) from the received message. After the internet connections of the first communication module 10 and the second communication module 12 are all successfully established, the data controlling module 104 determines the distributions of the packet to be transmitted according to the information of two communication module 10 and 12, such as their network protocols, maximum network bandwidth, and network traffics. The source of the packet to be transmitted can be an application 140 of the mobile device 1 or connect to a computer in internet through the mobile device 1 (function as a modem). The mobile device with faster connection rate and better network transmission can be distributed by more weight of the packets, while the mobile device with slower connection rate and poor network transmission can be distributed by less weight of the packets. The percentages of the distributed packet to be transmitted are dynamically determined. The data controlling module 104 can dynamically distribute the percentages of the packet according to the real-time updated network statuses.

Otherwise, when the first communication module 10 and the second communication module 12 exchange information through the local area connection therebetween, thereby transmitting the packet or a part of the packet to the internet 2 through the local area connection and the second internet connection I2 established by the second communication module 12, the packet to be transmitted through the second internet connection I2 is encapsulated and transmitted to the second communication module 12 through the local area connection and then to the internet 2 through the second internet connection I2. The steps of encapsulating the packet and transmitting the encapsulated packet through the local area connection are performed by tunnel encapsulation technology, such as IP-in-IP tunneling or GRE (Generic Routing Encapsulation) tunneling. In contrary, after the second communication module 12 of the mobile device receives the packet from the internet 2, and before the received packet is transmitted to the first communication module 10 through the local area connection, the packet is also encapsulated by the tunnel encapsulation technology. After that, the data controlling module 104 can de-encapsulate the packet and then transmit it to the application layer. The IP-in-IP tunneling encapsulation technology is disclosed in the reference of IETF RFC2003.

In other words, the mobile device of the invention may be inserted with multiple SIM cards, which are the above-mentioned first communication module 10 and the second communication module 12, for individually connecting to the mobile network to enable the internet connections and data packet transmissions. In brief, the first communication module 10 can serve as a major modem, and the second communication module 12 can serve as a minor modem. In this case, there are two paths provided for transmitting the data packets. One path is through a connection directly from the major modem to the internet, the other one is from the major modem to the minor modem and then through a connection from the minor modem to the internet. The data packets are transmitted from the application layer to the major modem, and then the major modem distributes these data packets to all available modems with a connection to internet. After that, the modems transmit the packets to the internet. In contrary, the data transmitted from the internet to the major modem through all paths are together send to the application layer by the major modem. After all modems normally establish their connections to internet, it is expected that the mobile device can reach a transmission rate roughly equal to the sum of the transmission rate of the major modem and the transmission rate of the minor modem.

As mentioned above, the mobile device 1 of the present invention can utilize multiple network addresses to transmit packets, and the communication modules of the mobile device 1 can individually establish their own internet connections. Accordingly, the connection rate of the mobile device 1 is equal to the sum of the transmission rates of all internet connections, such as the first and second internet connections. If one of the communication modules can not successfully establish the connection, the mobile device can still access the internet through the residual communication module(s).

In addition, the network layer of the mobile device is configured with a data controlling unit for recording the internet connection statuses of several communication modules, controlling the distributions of the data packets to be uploaded, and integrating the data packets downloaded from different communication modules.

Although the present invention has been described in considerable detail with reference to certain preferred embodiments thereof, the disclosure is not for limiting the scope. Persons having ordinary skill in the art may make various modifications and changes without departing from the scope.

Therefore, the scope of the appended claims should not be limited to the description of the preferred embodiments described above.

What is claimed is:

1. A data transmitting method, applied to a mobile device for transmitting data from the mobile device to a destination on an internet, wherein the mobile device comprises a first communication module and a second communication module, the method comprising steps of:
    establishing a first internet connection between the first communication module and the internet;
    establishing a second internet connection between the second communication module and the internet;
    establishing a local area connection between the first communication module and the second communication module;
    dividing the data to be transmitted into several packets;
    transmitting a first part of the packets from the first communication module to the destination through the first internet connection, and a second part of the packets from the first communication module to the destination through the local area connection and the second internet connection;
    recording a first connection status with respect to the first internet connection and a second connection status with respect to the second internet connection;
    wherein the step of transmitting part of the packets through one of the first internet connection and the local area connection is performed according to the first connection status with respect to the first internet connection and the second connection status with respect to the second internet connection, and
    dynamically adjusting percentages of the first part and the second part according to the first connection status and the second connection status.

2. The method of claim 1, wherein before the step of transmitting the second part of the packets from the first communication module to the destination through the local area connection and the second internet connection, the method further comprises a step of:
    encapsulating the second part of the packets.

3. The method of claim 2, wherein the step of encapsulating the second part of the packets is performed by tunnel encapsulation.

4. A mobile device, comprising:
    a first communication module for establishing a first internet connection between the first communication module and an internet;
    a second communication module for establishing a second internet connection between the second communication module and the internet;
    a plurality of local area communication modules for establishing a local area connection between the first communication module and the second communication module;
    a packet dividing module for dividing data to be transmitted into a plurality of packets;
    a data controlling module for transmitting a first part of the packets from the first communication module to the destination through the first internet connection, and a second part of the packets from the first communication module to the destination through the local area connection and the second internet connection;
    a recording unit for recording a first connection status with respect to the first internet connection and a second connection status with respect to the second internet connection; and
    a processing unit for dynamically adjusting percentages of the first part and the second part according to the first connection status and the second connection status.

5. The mobile device of claim 4, wherein each of the first communication module and the second communication module is a GSM communication module, a 3G mobile communication module, or a 4G mobile communication module.

6. The mobile device of claim 4, wherein the local area connection modules are Bluetooth communication modules, Wi-Fi communication modules, or ZigBee communication modules.

7. The mobile device of claim 4, wherein the local area connection is a LAN connection or a PAN connection.

8. The mobile device of claim 4, wherein the first communication module and the second communication module have independent network addresses, respectively, while establishing the first internet connection and the second internet connection.

9. A data transmitting method applied to a mobile device, wherein the mobile device comprises a first communication module and a second communication module, a first internet connection is established between the first communication module and an internet, and a local area connection is established between the first communication module and the second communication module, the method comprising steps of:
    receiving a packet;
    selectively transmitting the packet through one of the first internet connection and the local area connection;
    if the packet is to be transmitted through the local area connection, encapsulating the packet; and
    transmitting the encapsulated packet through the local area connection,
    wherein a second internet connection is established between the second communication module and the internet, and the method further comprises a step of:
    recording a first connection status with respect to the first internet connection and a second connection status with respect to the second internet connection,
    wherein the step of selectively transmitting the packet through one of the first internet connection and the local area connection is performed according to the first connection status with respect to the first internet connection and the second connection status with respect to the second internet connection,
    wherein percentages of a first part of the packet to be transmitted through the first internet connection and a second part of the packet to be transmitted through the second internet connection are dynamically adjusted according to the first connection status and the second connection status.

10. The method of claim 9, wherein the step of transmitting the encapsulated packet through the local area connection after the packet is encapsulated is performed by tunnel encapsulation.

11. The method of claim 9, further comprising steps of:
    receiving another packet from the internet either through the first internet connection or through the second internet connection and the local area connection; and
    if the another packet is received through the second internet connection and the local area connection, de-encapsulating the another packet.

* * * * *